United States Patent [19]

Tamblyn

[11] Patent Number: 4,590,992
[45] Date of Patent: May 27, 1986

[54] THERMAL STORAGE SYSTEMS WITH ANTIBLENDING DISC

[76] Inventor: Robert T. Tamblyn, 12 Littlebrook Court, R.R. #2, Gormley, Ontario, L0H 1G0, Canada

[21] Appl. No.: 626,429

[22] Filed: Jun. 29, 1984

[30] Foreign Application Priority Data

May 2, 1984 [CA] Canada .................................... 453356

[51] Int. Cl.⁴ .......................... F28D 21/00; F24J 3/02
[52] U.S. Cl. ............................... 165/104.19; 126/437; 137/592
[58] Field of Search ................... 165/104.19; 126/437; 137/592

[56] References Cited

U.S. PATENT DOCUMENTS

| 4,248,049 | 2/1981 | Briley | 126/437 |
| 4,390,008 | 6/1983 | Andrews | 126/437 |
| 4,501,262 | 2/1985 | Lyon | 126/437 |

FOREIGN PATENT DOCUMENTS

| 12239 | 1/1982 | Japan | 126/437 |
| 28951 | 2/1983 | Japan | 126/437 |

Primary Examiner—Albert W. Davis, Jr.
Attorney, Agent, or Firm—Gipple & Hale

[57] ABSTRACT

Disclosed is a system for conditioning a load using circulation of temperature controlled water where there is provided thermal storage means for holding varying volumes of water at different temperatures and the storage means comprises at least one tank having a constant cross-section between opposed vertical ends. A disc between the ends of the tank separates the tank into first and second variable volume chambers and prevents blending of water at different temperatures in the chambers. Conduits selectively feed water into one chamber while simutaneously removing water from the other chamber, the disc means moving in the tank in accordance with the feeding and withdrawal of water from the chambers whereby the volume of water in each chamber may vary but the total volume of water in the tank means is substantially constant. The disc is maintained substantially perpendicular to a vertical axis of the tank during its movement within the tank by a cable and pulley mechanism or vertical guides in association with the disc.

22 Claims, 11 Drawing Figures

THERMAL STORAGE SYSTEMS WITH ANTIBLENDING DISC

FIELD OF INVENTION

This invention relates to improvements in thermal storage systems and in particular to improvements in thermal storage tanks having anti-blending means.

BACKGROUND OF INVENTION

Modern commercial buildings must discard significant quantities of waste heat during their occupied cycle in cold weather. During nights and week-ends however, there is a reversal in which heat must be imported to maintain temperature.

Thermal storage can provide a means of enhancing energy conservation when applied to buildings with significant interior heating gain, some of which may be solar originated. Thermal storage systems can effect savings in fuel, electric cooling demands and electric utility investment.

Although thermal storage tanks may be constructed of non-corrosive steel, the cost for large tanks of such material is generally prohibitive. The material generally used in the construction of thermal storage tanks has been concrete and in using concrete there has been a tendency to incorporate thermal storage tanks as part of the structural elements in a building which necessitates co-operative design between the architect, structural engineer and mechanical engineer. Notwithstanding, and despite additional costs to include waterproofing coating membranes, concrete tanks for thermal storage purposes do not have a good record against leakage. Many leaks can be fixed but are generally unsightly and leaks always raise concern of having an effect on the structural aspects of the building including possible soil erosion and building settlement. Often the leaks occur in the vicinity of the side inlet and outlet pipes and if pump rooms are in the proximate area, leakage could partially flood such rooms.

Accordingly thermal storage tanks should preferably not be designed as part of the structural elements in buildings and the conduit connections with the tank should be associated where possible with the top of the tank, not the sides or bottom.

Further, one of the major problems encountered in thermal storage systems is the temperature blending of water. Although there may be cases where blending exacts no penalty (or is even desirable), there are many situations where blending can nullify the benefits of thermal storage. At temperatures in the 5° to 15° C. range, there is little difference in the buoyancy of water and there is a tendency for thermal tanks to destratify with any turbulence at the inlet or outlet of the storage tank. Temperature blending reduces the value of storage by debilitating the prime temperature which may be necessary to fulfill results in simple systems.

There are a number of concepts that have been developed to control or eliminate temperature blending of water in thermal storage systems and maintain separation between the prime water temperature and that returning from the building system.

Canadian Pat. No. 1,038,176 granted Sept. 12, 1978 and its corresponding U.S. Pat. No. 4,135,571 granted Jan. 23, 1979 relate to thermal storage systems and in particular show in one embodiment a movable or floatable tank diaphragm or membrane and show in other embodiments solid separation of a storage tank by a vertical baffle and associated pulley mechanism.

Even with diaphragms or membranes moving in an up-down mode, some problems arise because the membrane has a tendency not to settle uniformly against the bottom of the tank, partly due often to the membrane gravitating or migrating toward the outlet pipe from which water is being withdrawn. Accordingly there has been a tendency to add additional structural elements within a tank and exterior thereto to protect the membrane and reduce the chances of it being damaged.

Membranes also tend to move haphazardly within the tank and even when suitably attached to the walls of the tank to move in an up-down mode rather than from side-to-side, there is not a clear demarcation of different temperatured zones. Haphazard movement of the membrane, which fail to maintain the "platform" of the membrane in a horizontal plane, also tends to shed the insulating film which develops above and below the horizontal element, thus increasing transfer of heat from warmer water above to stored cold water below. Side panels in the membrane also provide areas where heat transfer could disadvantageously take place.

The vertical orientated baffle has a tendency to move in a stepwise fashion or on a slant providing for possible unwanted slippage of water past the membrane.

The present invention seeks to provide a thermal storage tank for use in air conditioning/heating systems which is relatively simple to construct, does not form part of the structural elements of the building and which has means to prevent blending of different temperatured water in the form of a disc which moves upwardly and downwardly within a tank having constant cross-section, the demarcation of the different temperatured water being therefore substantially horizontal at all times. The floating disc assures horizontality of the temperature separation, minimizing heat transfer. Lacking the side panels of the membrane it also benefits from reduced heat transfer through those elements of the membrane and slippage of water between chambers is maintained to a minimum.

SUMMARY OF INVENTION

The invention in one aspect pertains to a system for conditioning a load using circulation of temperature controlled water including thermal storage means for holding varying volumes of water at different temperatures, the storage means comprising at least one tank having a constant cross-section between vertically opposed ends. A disc between the ends of the tank separates the tank into first and second variable volume chambers and prevents blending of water at different temperatures in the chambers. Conduits selectively feed water into one chamber while simultaneously removing water from the other chamber, the disc means moving in the tank means in accordance with the feeding and withdrawal of water from the chambers whereby the volume of water in each chamber may vary but the total volume of water in the tank means is substantially constant. Means maintain the disc substantially perpendicular to a vertical axis of the tank during its movement within the tank. Preferably the means for maintaining the horizontality of the disc is by a cable and pulley mechanism or vertical guides in association with the disc.

The invention also contemplates a system for thermally conditioning a load wherein the load is in a substantially closed water piping circuit and includes pump means having an intake side for pumping water about the circuit. Heat transfer means is provided for conditioning water in the circuit prior to the load in order to condition the load to a desired temperature. The thermal storage means comprises a substantially closed constant cross-sectional tank having disc means for separating the storage means into variable volume chambers capable of storing water at different tempertures. At least a portion of the storage means is below the pump means. The disc means prevents blending of different temperatured water within the chambers and there is means to maintain the disc means substantially perpendicular to a vertical axis of the tank during movement in response to water withdrawn from and water flowing into respective ones of the chambers. Two conduits are in flow connection with the tank and the circuit, one conduit being in flow connection with one of the chambers and the other conduit being in flow connection with the other of the chambers. An open expansion tank is in flow connection with one of the conduits and the intake side of the pump means. The storage tank and circuit is under sufficient pressure to maintain water in the expansion tank and provide positive suction to the pump at all times. Means are provided for selectively operating the heat transfer means to regenerate one chamber in the tank with water at a temperature suitable to condition the load to the desired temperature.

Other aspects and advantages of the invention will become apparent from the following detailed description given by way of example in the preferred embodiments of the invention.

DESCRIPTION OF THE PREFERRED EMBODIMENTS

Figure 1:
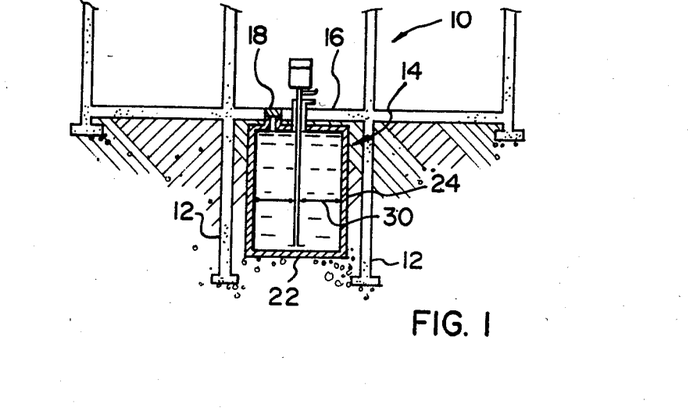
FIG. 1 shows a partial sectional view of structural elements of the building and a separate tank structure in accordance with this invention.

Referring to the drawings and in particular to FIG. 1, the ground structure and sub-structure 10 of a building includes column supports 12 between which, but structurally separate therefrom, is cylindrical thermal storage tank 14. Tank 14 is shown located below building floor 16 with access to the interior of the tank being through floor access means 18.

Tank 14 comprises top and bottom walls 20, 22 and cylindrical wall 24 with the top and bottom walls integrally constructed therewith, top wall 22 including tank access means 26, more fully referred to herein.

Figure 2:
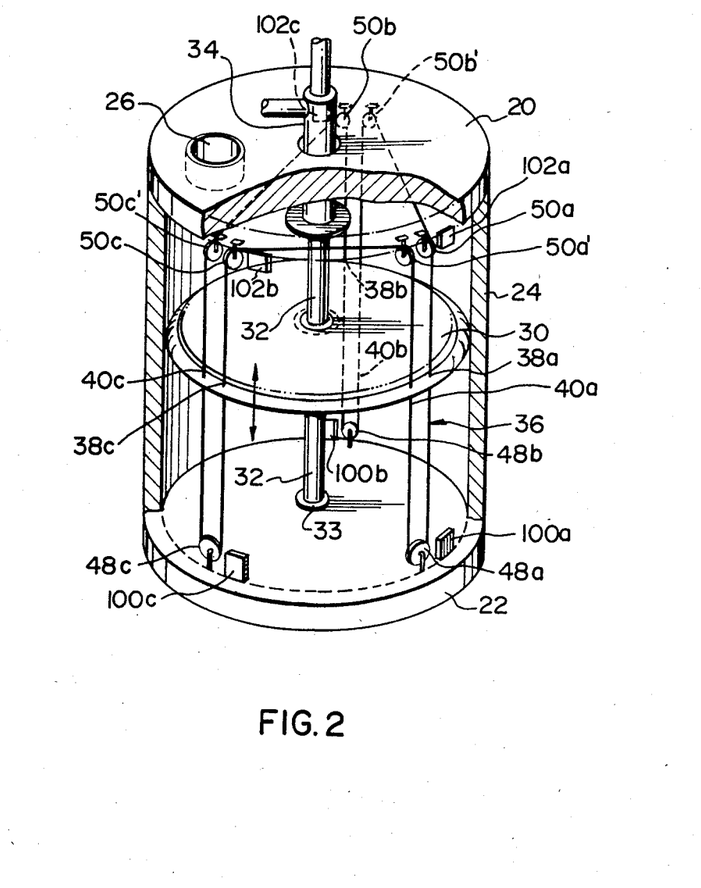
FIG. 2 shows a perspective view of the top, bottom and sides of a cylindrical tank and the anti-blending disc controlled for movement within the tank.

FIG. 2 shows a perspective view of thermal storage tank 14 with the front portion of cylindrical wall 24 removed. Within tank 14 and centrally located is anti-blending disc 30, the periphery of which is spaced inwardly a relatively small distance from the inner peripheral surface of tank wall 24. Co-axial with tank 14 is lower conduit or pipe 32 which has a bottom flange 33 spaced from the bottom 22. Upper conduit or pipe 34 is larger than pipe 32 and co-axial therewith. Both pipes 32 and 34 will be referred to more fully herein. The inner periphery of disc 30 is spaced a relatively small distance from the outer peripheral surface of pipe 32.

Vertical movement of disc 30 is controlled by the inflow and outflow of water above and below disc 30 as referred to further herein. A pulley system maintains disc 30 in a substantially horizontal plane as it moves vertically, the system including cable 36 attached to disc 30 at outer periphery points 38a, 38b and 38c. Free vertical portions of cable 36 at 40a, 40b and 40c pass between the outer peripheral edge of disc 30 and the inner peripheral surface of tank wall 24. Cable 36 is wound about bottom pulleys 48a, 48b and 48c suitably mounted to tank bottom 22 and also about top pulleys 50a and 50a', 50b and 50b' and 50c and 50c' mounted to the undersurface of top 20.

The pulley system shown in FIG. 2 permits movement of disc 30 upwardly or downwardly depending on the flow of water into or out of the tank above and below disc 30 and yet maintains disc 30 in a substantially horizontal plane. Cable 36 is made of non-corrosive material such as stainless steel whereas the pulleys 48a, b and c, 50a, b and c and 50a', b' and c' are also of non-corrosive material such as stainless steel or strong plastic material. Adjacent vertical cable portions 36 and 40 are substantially parallel and the location of and respective size of the top and bottom pulleys are selected to provide for the parallelism of these cable portions.

FIGS. 3 to 6 show in greater detail the construction of disc 30. Disc 30 is comprised of aluminum or stainless steel hoops 60 and 62 which are co-axially spaced by spokes 64 suitably fastened between the hoops. Hoops 60, 62 and spokes 64 are actually made in sections with 65 denoting the section breaks whereat the associated ends of adjacent sections are secured together by suitable fastening means which include telescoping portions or screw fastened sleeve elements. The sectionalization of the frame of disc 30 enables it to be easily passed through access hole 26. Impervious fabric material 66 is suitably fastened to hoops 60 and 62 by screw fastened, sectioned bar means 67. The fabric material comprises nylon coated with plastic material such as PVC or TEFLON ®. Buoyancy materials are included within the disc or attached to the frame so that the disc is substantially water weight, i.e. it does not have a marked tendency to either float or sink.

Fabric material 66 is made in sections (not shown) which can be radially zippered together. A normally closed zippered aperture 69 provides for access below disc 30 when inspection or repairs are to be carried out.

Figure 5:
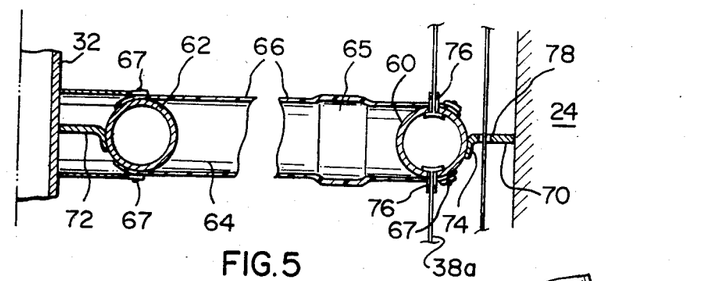
FIG. 5 is an enlarged view of the right side portion of the disc shown in FIG. 4, further showing the inner and outer edge constructions of the disc.
Figures 6, 7:
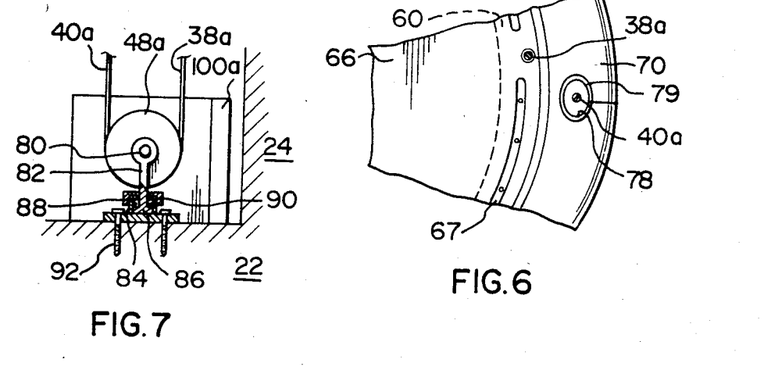
FIG. 6 is a partial top view of the right hand portion of FIG. 5.
FIG. 7 shows an enlarged view of a pulley mounting.

As shown more particularly in FIGS. 5 and 6, inner and outer peripheral seal means 70 and 72 which is also sectionalized is secured by riveting or glue fastening to the perimeter of the respective hoops 60 and 62. Flexible seals 70 and 72 maintain a form of seal between disc 30 and the inner peripheral surface of tank wall 24 and the outer peripheral surface of conduit 32. The seals also assist to some extent in guiding disc 30 upwardly and downwardly. Both seals 70, 72 however will permit water to by-pass disc 30 if circumstances dictate.

Cable portion 38a is secured to hoop 60 by suitable securing means 76 which include Allen screws or the like (not shown). Free cable portion 40a passes through split aperture 78 in seal 70. Suitable hard metal or plastic split sleeve 79 surrounds the aperture to reduce deterioration of seal 70 due to friction with cable portion 40a. It will be appreciated that although cable portion 38a is shown as securing opposite ends to hoop 60, such construction is only necessary for the extreme ends of cable 36. If cable 36 is one continuous length of cable, portions 38b and 38c can simply extend through hoop 60 with only one securing means 76 to fix disc 30 relative to portions 38b and 38c.

FIG. 7 shows an enlarged view of cable pulley 48a about which cable portions 38a and 40a extend. Pulley 48a is journalled for rotatable movement on pivot 80 which pivot is fastened to pivot yoke support means 82 which is rotatable about a vertical axis. Pulley support housing 84 surrounds flanged end 86 of support 82 and cap 88 is threadably fastened to housing 84. Compression coil spring 88 is captured within housing 84 and cap 86 and provides tension bias means for pulley 48a. Support housing 84 is secured to flange 90 by welding or the like which flange 90 in turn is mounted to tank bottom 22 through non-corrosive anchor bolts 92. A similar construction for each of the pulleys is provided within the tank. Adjacent each of the bottom pulleys and each of the top pulleys are stop blocks 100 and 102 respectively which may be constructed of concrete, integral with the tank top, bottom and/or side or may be of any other suitable non-corrosive material suitably fastened to provide stop movement for disc 30. Spring loaded pulleys provide for thermal expansion and contraction in the cable system.

Figure 8:
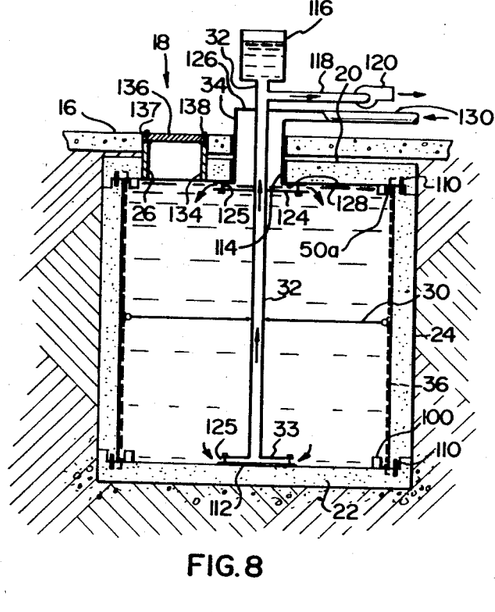
FIG. 8 shows a cross-sectional view of the tank in which a disc is schematically shown.

FIG. 8 shows thermal storage tank 14 with antiblending disc 30 and more fully illustrates down pipes 32 and 34. Tank 14 is in the form of a vertical cylinder and is reinforced with normal reinforcing steel, the construction of the tank being along conventional methods which places the concrete in permanent compression to reduce or eliminate leakage. The circumferential reinforcing steel can be protected by a concrete spray and this wall also completes the wall thickness. At the junction of the top and bottom, water bars 110 can be used to prevent leaks occurring between concrete pour areas. The inside of tank wall 24 is trowelled smooth to a substantially cylindrical configuration to facilitate the anti-blending hardware. It should be appreciated that the drawings are not to a scale but tanks 14 may be from 10 to 20 feet in height with diameter from 15 to 50 feet. The tanks can be site fabricated and the walls built up from rich concrete spray. This type of construction reduces or eliminates costly framework and permits thicknesses of tank walls much thinner than conventional rectangular tank walls which were associated with building columns or other structural elements of the building.

Water conduit 32 is co-axial with tank 14 and extends downwardly within the tank to flange 33 adjacent to tank bottom 22. Secured to bottom 22 is deflector plate 112 which will remove the pitting effect water exiting from conduit 32 might otherwise have on bottom 22. Flange 33 and plate 112 peripherally direct and guide water flow along the bottom of tank 14.

Conduit 32 extends upwardly through opening 114 in tank top 20 and through floor 16 to open expansion tank 116. Conduit 118 which leads to system water pump 120 connects to conduit 32 below expansion tank 116. The purpose of expansion tank 116 will be more fully referred to herein but is preferred since water in storage tank 14 can be slightly pressurized and thereby provide positive pump suction pressure to pump 120 located above storage tank 14.

Adjacent aperture 114 and welded or otherwise fastened to conduit 32 is top deflector plate 124 which has a similar purpose to plate 33, plate 124 peripherally directing and guiding water to and from larger co-axial conduit 34. Peripherally spaced bolts 125 provide additional support for plates 33 and 124 relative to respective ends of tank 14. Conduit 34 has a closed end 126 and end flange 128 secured to the inner surface of top 20. Conduit 130 extends from conduit 34 and through floor 16 for association with the system.

Access means 18 includes tank access hole 26 having lining 134 secured therewithin. Manhole type cover 136 is in a gasketed sealed association with the upper portion of lining 134 which is also associated with a suitable opening 137 in floor 16. Removable bolts 138 secure cover 136 to lining 134.

Figure 9:
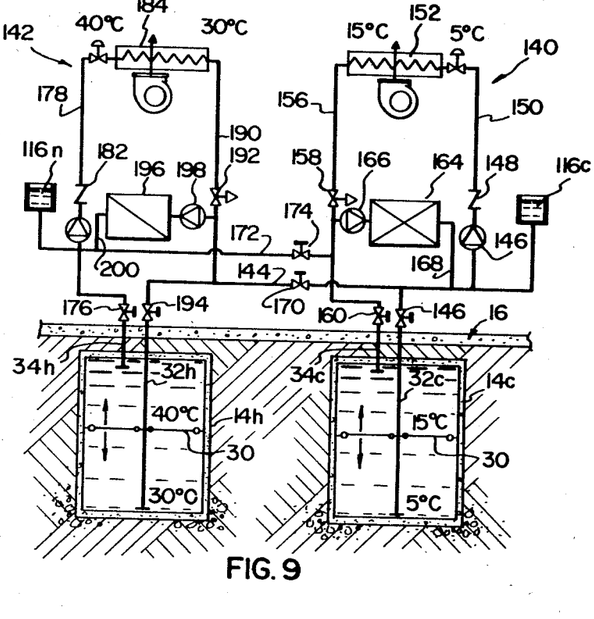
FIG. 9 shows a simplified pipe circuit in which the tank is incorporated for thermal storage, appearing with FIG. 1.

FIG. 9 illustrates schematically typical circuits for a two tank heating and cooling thermal storage system. Dual temperature storage increases the viability of the system and permits both tanks to be converted to cooling for example when demand requires it.

The circuitry arrangement shown in FIG. 9 is for heating and cooling, circuit 140 for cooling, circuit 142 for heating. With respect to the cooling circuit 140, conduit 32c is connected to header pipe 144 through isolation valve 146. Chilled water circuit pump 146 and check valve 148 in conduit 150 provide chilled water flow to building load cooling coils 152, only one of the coils being shown for simplicity. Water returns from coils 152 via conduit 156 through constant back pressure valve 158 and flows into conduit 34c through isolation valve 160. It will be appreciated that chilled 5° C. water stored below disc 30c in tank 14c can be pumped around the circuit to coils 152 and the return water at 15° C. is simultaneously fed into tank 14c above disc 30c. Chiller heat transfer means 164 and chiller pump 166 within conduit 168 can provide additional cooling as daytime demand requires. At night when pump 146 is shut down, chiller 164 and pump 166 are operated so that water above disc 30c at 15° C. is pumped upward through conduit 34c and part of conduit 156, through chiller 164 which produces 5° C. water, and through conduit 168 to conduit 32c. The chilled 5° C. water forces disc 30c upwardly and the chilled water tank 14c is replenished overnight for supplementing or completely handling the cooling load for the next day. Expansion tank 116c provides continuous positive suction for pumps 146 and 166 even though the pumps are above tank 14c. Tank 14c is under slight pressure, e.g. 8 psi.

The portion of header 144 associated with chilled water circuit 140 is normally isolated by seasonal allocation valve 170 from the portion of header 144 associated with heated water circuit 142. Similarly header 172 is isolated within the hot water circuit by seasonal allocation valve 174. In the heating circuit system, hot, 40° C., water above disc 30h is pumped via conduit 34h through isolation valve 176 to conduit 178 in which is hot water circuit pump 180 and check valve 182. Hot water is pumped to the building load radiation coils 184 (only one coil being shown) and returns via conduit 190 through constant back pressure valve 192 to heder 144 and through isolation valve 194 to conduit 32h, the returning 30° C. water being returned to tank 14h below disc 30h.

Within circuit 142 is condenser heat transfer means 196, associated pump 198 and conduit 200 to supplement or support heating demand. Although not shown, there is also normally associated with circuit 142 additional heat transfer means such as a tower heat exchanger and auxiliary heater in accordance with conventional practice and building location demands. The various heating means are selectively controlled in a conventional manner in accordance with demand for heating at the various heating coil locations in the building. Expansion tank 116h has a similar function in circuit 142 as tank 116c has to circuit 140.

It will be apparent that during summer with seasonal allocation valves 170, 174 open and the heating circuit otherwise shut down, both tanks 14c and 14h can be utilized for cooling purposes as demand requires.

Figures 10, 11:
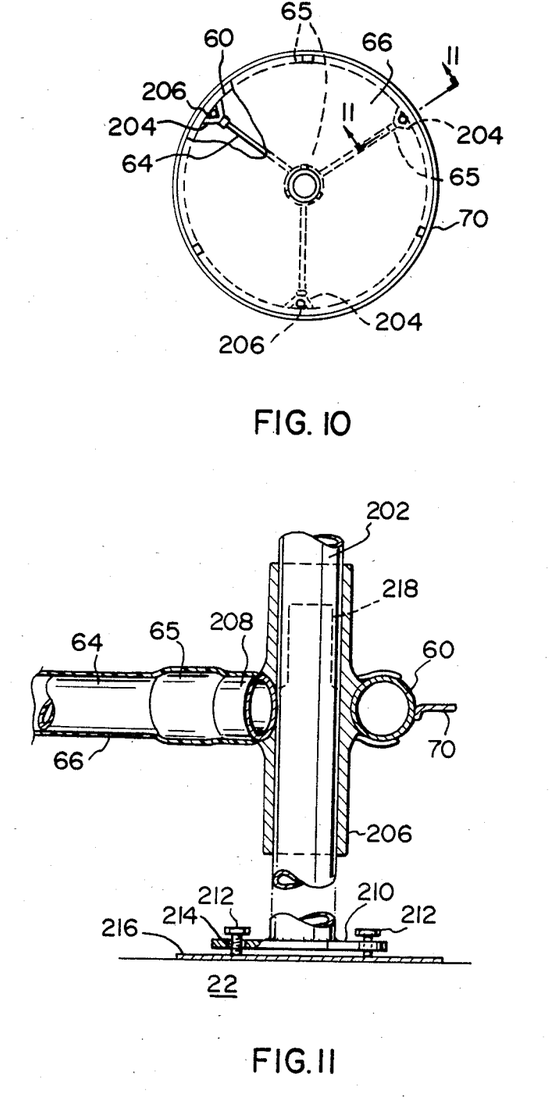
FIG. 10 is a top view of another embodiment of the disc.
FIG. 11 is a partial view of the disc of FIG. 10 taken along line 11—11 of FIG. 10.

FIGS. 10 and 11 illustrate an alternative embodiment with respect to controlling vertical movement of disc 30 so that it is held substantially horizontal. Instead of the cable-pulley system previously described, posts 202 of non-corrosive material such as stainless steel are anchored to the top and bottom of tank 14 in axially parallel alignment. Spokes 64 have yoke ends 204 which provide mounting areas for elongated sleeve 206. FIG. 11 shows one arm 208 of the yoke broken away with sleeve 206 in section. Each post 202 has perpendicular plate 210 at each end (only one being shown) which is secured thereto by welding or the like. A plurality of circumferentially spaced bolts 212 are threadedly associated with bolt holes 214 in plate 210 so that post 202 may be vertically located within tank 14. Bolts 212 at each end are tightened down to vertically align and secure post 202 between tank ends. Bearing plate 216 of non-corrosive material is secured by separate anchor means (not shown) to the end wall in the area where post 202 is to be located thereby providing a bearing surface for the ends of bolts 212. Posts 202 can be made in sections with telescoping connections as shown at 218. As an alternative plates 210 at each end can be secured to a tube which has external threads which threadedly engage internal threads of post 202 at each end. The threads would be opposite at each end whereby rotation of post 202 would cause the end plates to extend or withdraw as required. Sleeves 206 of non-corrosive material are slidable relative to posts 202 and of such a length that they collectively restrict any tendency of disc 30 to tilt from the horizontal. Sleeves 206 also inherently provide stop means for disc 30 so that blocks 100 could be omitted. Although not shown, sleeves 206 could also include a circular flexible gasket secured to the opposite ends of the sleeve and in contact with post 202 in order to reduce or eliminate foreign material entering the sleeve.

Accordingly there is provided a thermal storage system in which an essentially water-weight disc moves up and down providing an effective water anti-blending means in a tank, is replenished overnig the tank having a minimum number of points of access thereto by piping hardware. Thus the tank may be cost effectively constructed with minimum possible leakage points.

Disc 30 is effectively centered and stabilized by the supply—extract conduit 32 which extends to the bottom of the tank and is maintained at all times in a substantially horizontal position by non-corrosive hardware means such as the pulley and cable system or the vertical posts. It will be appreciated that if an open top tank is desired, the hardware at the tank top would be associated with bars secured across the tank top at appropriate locations.

In starting up the storage system, the tanks will be filled to the top under disc 30 and when disc 30 reaches upper stop blocks 100, water will be forced above the disc around the seals 70, 72. Filling the tank to the top and placing it under slight pressure provides positive suction for the circuit pumps allowing them to be mounted above the tank for space saving and easier maintenance. The pressure is sufficient to maintain water in the expansion tank but not sufficient to cause leakage through sealed access cover 136. Filling the tanks to the top also reduces the development of algae within the tank and uses the total volume of the tank.

Figure 3:
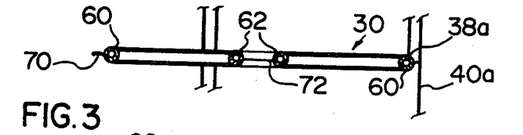
FIG. 3 is a top view of the anti-blending disc.
Figure 4:
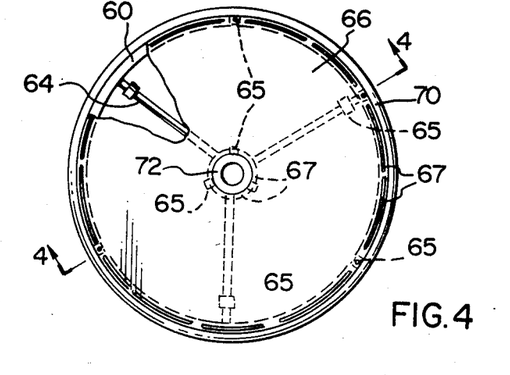
FIG. 4 is a sectional view of the anti-blending disc taken along line 4—4 of FIG. 3.

Disc 30 is shown as including outer and inner peripheral tubing 60, 62 which can be $1\frac{1}{2}''$-$2''$ in diameter with interconnecting spokes 64. It should be appreciated that with smaller tanks, it is not necessary to have spokes 64 and only one sheet of material 66 is required with buoyancy material if required, attached to hoop 60 at spaced locations.

FIG. 6 shows free cable portion 40a passing through split aperature 78 in seal 70, the split permitting insertion of portion 40a into aperture 78 without "threading". It should be appreciated that "aperture 78" may be formed as a "V" cut in the seal 70 with free cable portion 40a passing within the "V" adjacent the interior wall surface of the tank. The mixing of different temperatured water as a result of this construction is minimum. The important aspect is that the cable portions be vertically aligned and parallel from top to bottom of the tank.

Further, although the preferred embodiment shows conduit 32 as a central guide for disc 30, other guide means could be provided with conduit means distinct from the guide means for controlling the flow of water into and out of tank 14 below and above disc 30. Moreover it will be appreciated that if the tank 14 is located above ground or actually within a building, the flow conduits may be connected to the tank at other locations. By way of example it may be desirable to have the top of the tank planar with the floor but not connected thereto and in some installations it is possible that the top of the tank could be a few feet above the floor but again separated therefrom. Moreover the tanks could be square or rectangular although cylindrical tanks are preferred. Within the scope of this application, its disclosure and claims, the term "disc" is not to be construed as limited to circular but is used to include other shapes of discs which are within tanks of constant vertical cross-section. Further, the term "water" encompasses other liquids which may be used in heating and air conditioning systems.

While this invention has been described in detail with particular reference to a preferred embodiment thereof, it will be understood that variations and modifications can be effected within the spirit and scope of the invention as described hereinbefore and as defined in the appended claims.

The embodiments of the invention in which an exclusive property or privilege is claimed are defined as follows:

1. In a system for conditioning a load using circulation of temperature controlled water, thermal storage means for holding varying volumes of water at different temperatures and comprising at least one tank of constant vertical cross-section and having opposed ends, disc means between the ends of said tank of separating the tank into first and second variable volume chambers and for preventing blending of water at different temperatures in the chambers, conduit means for selectively feeding water into one chamber while simultaneously removing water from the other chamber, said disc means moving in said tank in accordance with the feeding and withdrawal of water from the chambers whereby the volume of water in each chamber may vary but the total volume of water in the tank is substantially constant, and means for maintaining said disc means substantially perpendicular to the vertical axis of said tank during its movement within the tank; said conduit means including one conduit extending centrally within said tank with an opening adjacent the inside surface of one tank end, said disc means having a central aperture therein adapted to closely surround said one conduit which conduit provides vertical stabilizing means for said disc means.

2. The system of claim 1 including a second conduit which is larger than and co-axial with said first conduit and has its opening adjacent the other end of said tank.

3. The system of claim 2 wherein said first conduit includes a radially extending deflector plate spaced from said second conduit opening.

4. The system of claim 1 wherein said tank includes cable means operatively associated with a plurality of pulley means peripherally spaced about and adjacent each said tank ends, said cable running about said pulley means and having predetermined portions attached to peripherally spaced points of said disc means whereby tilting of said disc out of the horizontal is restricted but vertical movement of said disc is permitted.

5. The system of claim 4 further including stop means adjacent each tank end for contact with said disc means to limit movement of said disc means to between said stop means. outer Peripheral flexible seal means for contact with the inner wall surface of said tank and the aperture of said disc means has inner peripheral flexible seal means for contact with said one conduit.

6. The system according to claim 1 wherein said means for maintaining said disc means substantially horizontal comprises peripherally spaced vertical posts between the ends of said tank, said disc means including sleeves adapted to slidably engage said posts to restrict tilting movement of said disc means.

7. The system of claim 4 wherein said disc means has a peripheral flexible seal means for contact with the inner wall surface of said tank thereby to effectively seal said chambers from each other even during movement of said disc means.

8. The system of claim 1 wherein said disc means has outer peripheral flexible seal means for contact with the inner wall surface of said tank and the aperture of said disc means has inner peripheral flexible seal means for contact with said one conduit.

9. In a system for thermally conditioning a load wherein the load is in a substantially closed water piping circuit, including:

pump means for pumping water about said circuit prior to said load in order to condition the load to a desired temperature;

thermal storage means comprising a substantially closed tank of constant cross-section having disc means for separating said storage means into variable volume chambers capable of storing water at different temperatures, at least a portion of said storage means being below said pump means;

said disc means preventing blending of different temperatured water within said chambers and means to maintain said disc means substantially perpendicular to a vertical axis of said tank during movement in response to water withdrawn from and water flowing into respective ones of said chambers;

two conduit means in flow connection with said tank and said circuit, one conduit means in flow connection with one of said chambers and the other conduit means in flow connection with the other of said chambers;

an open expansion tank in flow connection with one of said conduit means and the intake side of said pump means;

said storage tank and circuit being under sufficient pressure to maintain water in said expansion tank and provide positive suction to said pump at all times;

means for selectively operating said heat transfer means to regenerate one chamber in said tank with water at a temperature suitable to condition said load to said desired temperature;

said one conduit means including a first conduit extending centrally within said tank with an opening adjacent the inside surface of one tank end, said disc means having a central aperture therein adapted to closely surround said first conduit which conduit provides vertical stabilizing means for said disc means.

10. The system of claim 9 wherein the other conduit means includes a second conduit which is larger than and co-axial with said first conduit and has its opening adjacent the other end of said tank.

11. The system of claim 10 wherein said first conduit includes a radially extending deflector plate spaced from said second conduit opening.

12. The system of claim 9 wherein said tank has two closed ends and said means for maintaining said disc means substantially horizontal include cable means operatively associated with a plurality of pulley means within said tank, said pulley means being peripherally spaced about said closed tank ends, said cable running about said pulley means and having predetermined portions attached to peripherally spaced points of said disc means whereby tilting of said disc out of the horizontal is restricted but vertical movement of said disc is permitted.

13. The system of claim 12 wherein the closed ends of said tank have stop means for contact with said disc means to limit movement of said disc toward said ends.

14. The system according to claim 9 wherein said means for maintaining said disc means substantially horizontal comprises peripherally spaced vertical posts between the ends of said tank, said disc means including sleeves adapted to slidably engage said posts to restrict tilting movement of said disc means.

15. The system of claim 9 wherein said disc means has a peripheral flexible seal means for contact with the inner wall surface of said tank thereby to effectively seal said chambers from each other even during movement of said disc means.

16. The system of claim 9 wherein said disc means has outer peripheral flexible seal means for contact with the inner wall surface of said tank and the aperture of said disc means has inner peripheral flexible seal means for contact with said one conduit.

17. In a system for conditioning a load using circulation of temperature controlled water, thermal storage means for holding varying volumes of water at different temperatures and comprising at least one tank of constant vertical cross-section and having opposed ends, disc means between the ends of said tank of separating the tank into first and second variable volume chambers and for preventing blending of water at different temperatures in the chambers, conduit means for selectively feeding water into one chamber while simultaneously removing water from the other chamber, said disc means moving in said tank in accordance with the feeding and withdrawal of water from the chambers whereby the volume of water in each chamber may vary but the total volume of water in the tank is substantially constant, and means for maintaining said disc means substantially perpendicular to the vertical axis of said tank during its movement with the tank, including cable means operatively associated with a plurality of pulley means peripherally spaced about and adjacent each said tank end, said cable running about said pulley means and having predetermined portions attached to peripherally spaced points of said disc means whereby tilting of said disc out of the horizontal is restricted but vertical movement of said disc is permitted.

18. The system of claim 17 further including stop means adjacent each tank end for contact with said disc means to limit movement of said disc means to between said stop means.

19. The system of claim 17 wherein said disc means has a peripheral flexible seal means for contact with the inner wall surface of said tank thereby to effectively seal said chambers from each other even during movement of said disc means.

20. In a system for thermally conditioning a load wherein the load is in a substantially closed water piping circuit, including:
heat transfer means for conditioning water in said circuit prior to said load in order to condition the load to a desired temperature;
thermal storage means comprising a substantially closed tank of constant cross-section having disc means for separating said storage means into variable volume chambers capable of storing water at different temperatures, at least a portion of said storage means being below said pump means;
said disc means preventing blending of different temperatured water within said chambers and means to maintain said disc means substantially perpendicular to a vertical axis of said tank during movement in response to water withdrawn from and water flowing into respective ones of said chambers, said tank having two closed ends and said means for maintaining said disc means substantially horizontal including cable means operatively associated with a plurality of pulley means within said tank, said pulley means being peripherally spaced about said closed tank ends, said cable running about said pulley means and having predetermined portions attached to peripherally spaced points of said disc means whereby tilting of said disc out of the horizontal is restricted but vertical movement of said disc is permitted;
two conduit means in flow connection with said tank and said circuit, one conduit means in flow connection with one of said chambers and the other conduit means in flow connection with the other of said chambers;
an open expansion tank in flow connection with one of said conduit means and the intake side of said pump means;
said storage tank and circuit being under sufficient pressure to maintain water in said expansion tank and provide positive suction to said pump at all times;
means for selectively operating said heat transfer means to regenerate one chamber in said tank with water at a temperature suitable to condition said load to said desired temperature.

21. The system of claim 20 wherein said disc means has a peripheral flexible seal means for contact with the inner wall surface of said tank thereby to effectively seal said chambers from each other even during movement of said disc means.

22. The system of claim 20 wherein said disc means has outer peripheral flexible seal means for contact with the inner wall surface of said tank and the aperture of said disc means has inner peripheral flexible seal means for contact with said one conduit.

* * * * *